(12) United States Patent
Shuman et al.

(10) Patent No.: US 9,774,552 B2
(45) Date of Patent: Sep. 26, 2017

(54) METHODS, SERVERS AND SYSTEMS FOR VERIFYING REPORTED LOCATIONS OF COMPUTING DEVICES

(71) Applicant: QUALCOMM Incorporated, San Diego, CA (US)

(72) Inventors: Mohammed Ataur Rahman Shuman, San Diego, CA (US); Sandeep Sharma, San Diego, CA (US); Amit Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 14/191,778

(22) Filed: Feb. 27, 2014

(65) Prior Publication Data
US 2014/0280645 A1 Sep. 18, 2014

Related U.S. Application Data

(60) Provisional application No. 61/782,735, filed on Mar. 14, 2013.

(51) Int. Cl.
| | |
|---|---|
| *G06Q 50/30* | (2012.01) |
| *H04L 12/58* | (2006.01) |
| *H04W 12/10* | (2009.01) |
| *H04W 64/00* | (2009.01) |
| *H04W 4/04* | (2009.01) |
| *H04W 4/02* | (2009.01) |
| *H04L 29/06* | (2006.01) |

(Continued)

(52) U.S. Cl.
CPC .............. *H04L 51/20* (2013.01); *H04W 4/02* (2013.01); *H04W 4/04* (2013.01); *H04W 12/10* (2013.01); *H04W 64/003* (2013.01); *H04L 63/0281* (2013.01); *H04M 2242/30* (2013.01); *H04W 4/10* (2013.01); *H04W 12/06* (2013.01)

(58) Field of Classification Search
USPC .................................................. 709/206, 203
See application file for complete search history.

(56) References Cited

U.S. PATENT DOCUMENTS

| | | | |
|---|---|---|---|
| 6,904,408 B1 * | 6/2005 | McCarthy | ............ A61B 5/6815 705/2 |
| 8,078,867 B2 | 12/2011 | Brown et al. | |

(Continued)

FOREIGN PATENT DOCUMENTS

| | | |
|---|---|---|
| KR | 20120052682 A | 5/2012 |
| WO | 2010051829 A1 | 5/2010 |

OTHER PUBLICATIONS

International Search Report and Written Opinion—PCT/US2014/036847—ISA/EPO—dated Aug. 18, 2014.

*Primary Examiner* — Jude Jean Gilles
(74) *Attorney, Agent, or Firm* — The Marbury Law Group, PLLC; Thien T. Nguyen

(57) ABSTRACT

Methods, servers and systems are disclosed for authenticating location information in a message from a sending computing device to a receiving computing device. Location information of a sending computing device at an actual location may be incorporated in the message. Location information in a message may be compared with information regarding the actual location of the sending computing device maintained by a server. The location information in the message may be authenticated based on the comparison.

18 Claims, 9 Drawing Sheets

(51) Int. Cl.
*H04W 4/10* (2009.01)
*H04W 12/06* (2009.01)

(56) References Cited

U.S. PATENT DOCUMENTS

| | | | |
|---|---|---|---|
| 8,090,780 B2 | 1/2012 | Almas et al. | |
| 8,155,669 B2 | 4/2012 | Ziskind et al. | |
| 8,370,629 B1 * | 2/2013 | Ngo | H04W 4/021 713/168 |
| 8,681,741 B1 * | 3/2014 | Ngo | H04W 4/023 370/331 |
| 2002/0108062 A1 * | 8/2002 | Nakajima | G06Q 20/04 726/9 |
| 2007/0005967 A1 * | 1/2007 | Mister | G06F 21/36 713/168 |
| 2007/0198832 A1 * | 8/2007 | Novack | H04L 9/3231 713/158 |
| 2008/0054072 A1 * | 3/2008 | Katragadda | G08G 1/123 235/384 |
| 2008/0112551 A1 | 5/2008 | Forbes et al. | |
| 2008/0271109 A1 * | 10/2008 | Singh | H04L 63/08 726/1 |
| 2009/0047937 A1 | 2/2009 | Zellner et al. | |
| 2010/0049615 A1 * | 2/2010 | Rose | G06Q 20/02 705/17 |
| 2010/0205316 A1 | 8/2010 | Xue et al. | |
| 2011/0082746 A1 | 4/2011 | Rice et al. | |
| 2012/0196568 A1 * | 8/2012 | Bakshi | G06Q 20/40 455/411 |
| 2012/0203663 A1 * | 8/2012 | Sinclair | G06F 21/30 705/26.41 |
| 2012/0253957 A1 * | 10/2012 | Bakshi | H04L 63/107 705/18 |
| 2013/0204786 A1 * | 8/2013 | Mattes | G06Q 20/40145 705/44 |
| 2013/0253996 A1 * | 9/2013 | Single | G06Q 50/30 705/13 |
| 2013/0303198 A1 * | 11/2013 | Sadasivam | H04W 4/023 455/456.5 |
| 2014/0099913 A1 | 4/2014 | Zellner et al. | |
| 2014/0157381 A1 * | 6/2014 | Disraeli | G06F 21/31 726/7 |

* cited by examiner

METHODS, SERVERS AND SYSTEMS FOR VERIFYING REPORTED LOCATIONS OF COMPUTING DEVICES

CROSS-REFERENCE TO RELATED APPLICATIONS

This application claims the benefit of priority to U.S. Provisional Patent Application Ser. No. 61/782,735, entitled "METHODS FOR VERIFYING REPORTED LOCATIONS OF MOBILE DEVICES," filed on Mar. 14, 2013, the contents of which are hereby incorporated by reference in their entirety.

FIELD

This disclosure generally relates to methods for verifying the location information included in messages sent from mobile devices to ensure the reported location information is accurate.

BACKGROUND

Social media applications, messaging applications and other applications commonly found on computing devices often include location information derived from application-oriented location based services for the device that may not be accurate for various reasons. It is possible that systematic errors are present in the location information generated by the location based services. It is also possible for the user to alter the location information derived from application-oriented location based services or to enter inaccurate location information about the user's current location. Errors inherent in the GPS system or based on application latencies may cause location information to be reported inaccurately in location based services, without any interaction or deliberate attempt by the user to alter the location information. Other location information may be derived from system level location-based services integrated in the device or from location information available from other devices, such as wireless access points or network infrastructure. The system level location information generally cannot be altered by the user.

SUMMARY

Various embodiment methods, servers, and systems enable authenticating location information that is reported by or indicated for a computing device in a received message. An embodiment method for authenticating location information provided in a message may include comparing location information incorporated in a message to a receiving computing device from a sending computing device at an actual location with information regarding the actual location of the sending computing device maintained in a server, and authenticating the location information based on the comparison. Some embodiments may include authenticating the location information based on the comparison by determining whether a difference between the second location and the first location information is within a defined threshold, and authenticating the second location information when the difference between the second location information and the first location information is within the defined threshold.

In some embodiments, the server may receive a registration of the sending computing device including location information regarding the actual location of the sending computing device and store this information for later reference. In an embodiment, the server may receive a request from the sending computing for the information regarding the actual location of the sending computing device maintained in the server, and in response send the information regarding the actual location of the sending computing device to the sending computing device, thereby enabling the sending computing device to authenticate the location information prior to transmitting the message to the receiving computing device. In a further embodiment, the server may receive from the receiving computing device a request for the information regarding the actual location of the sending computing device maintained in the server, and send that information to the receiving computing device in response, thereby enabling the receiving computing device to authenticate the location information in a message received from the sending computing device by comparing location information incorporated in the message with information regarding the actual location of the sending computing device received from the server. In a further embodiment, the server may receive from a proxy server a request for the information regarding the actual location of the sending computing device maintained in the server, and send that information to the proxy server in response, thereby enabling the proxy server to either authenticate the location information in a message received from the sending computing device by comparing information regarding the sending computing device's location incorporated in the message with location information regarding the actual location of the sending computing device received from the server before sending the message on to the receiving computing device, or including the location information regarding the actual location of the sending computing device received from the server along with the message sent on to the receiving computing device. In an embodiment, the proxy server may modify the message by substituting the location information regarding the actual location of the sending computing device received from the server for the information regarding the sending computing device's location included in the original message before sending the message on to the receiving computing device when the comparison reveals that the information in the original message differs substantially (exceeds a threshold) from the location information received from the server. In a further embodiment, the server may receive from the receiving computing device information regarding the sending computing device's location included in the original message, compare the received information regarding the sending computing device's location with location information regarding the actual location of the sending computing device maintained by the server, and providing an indication to the receiving computing device of a result of the comparison of the second location information with the first information in response to the query.

Further embodiments include a communication system including a sending computing device, a receiving computing device, a server, a proxy server, and means for performing functions of the methods described above. The means for performing such functions may be a processor of the sending computing device, be a processor of the receiving computing device, the server, and/or the proxy server configured with executable instructions to perform operations corresponding to the methods described above. A further embodiment includes a proxy server configured with processor executable instructions to perform proxy server operations corresponding to the methods described above. A further embodiment includes a computing device configured with processor-executable instructions to perform computing device operations corresponding to the methods described above.

BRIEF DESCRIPTION OF THE DRAWINGS

The accompanying drawings, which are incorporated herein and constitute part of this specification, illustrate embodiments of the invention, and together with the general description given above and the detailed description given below, serve to explain the features of the invention.

DETAILED DESCRIPTION

Figure 1:
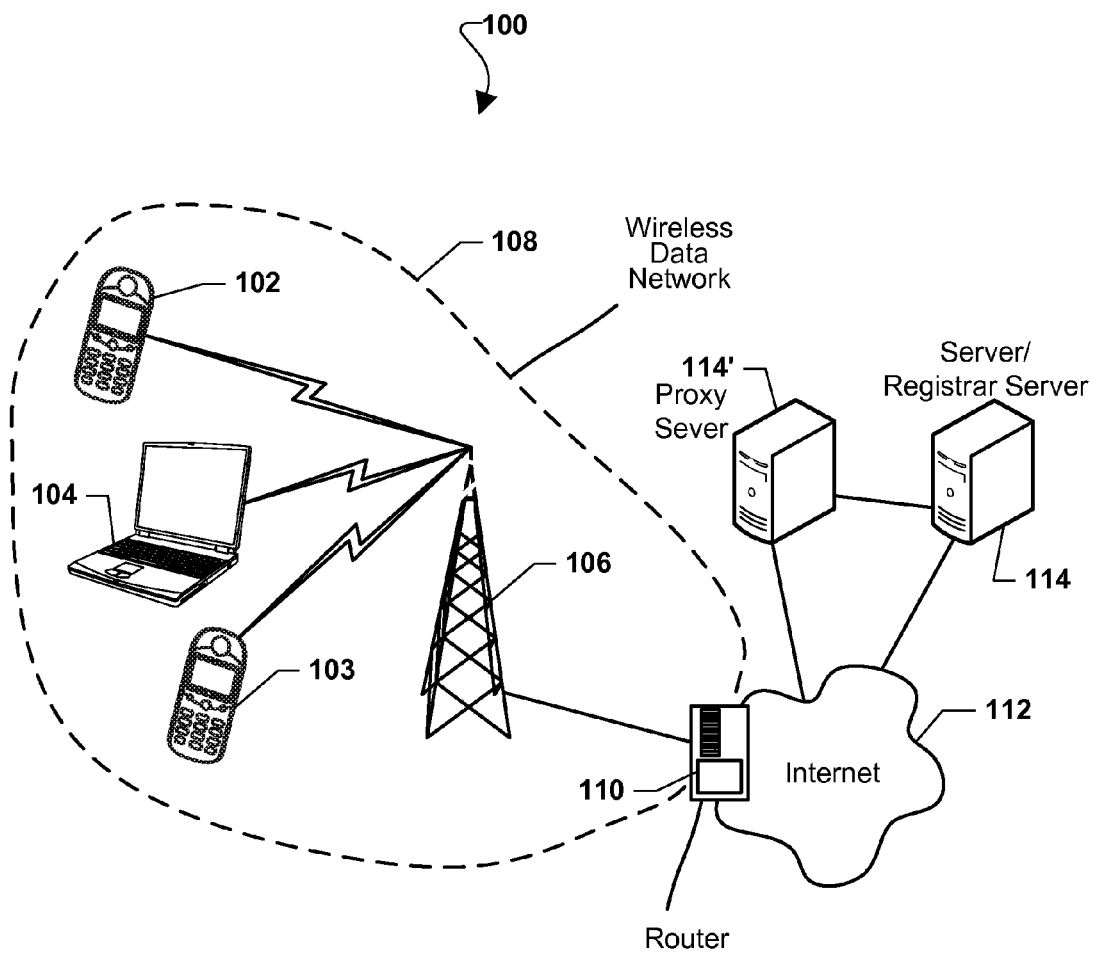
FIG. 1 is a communication system block diagram of a network suitable for implementing with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments. Likewise, the term "embodiment" does not require that all embodiments of the invention include the discussed feature, advantage or mode of operation.

The terms "computing device" and "mobile device" are used interchangeably herein to refer to any one or all of cellular telephones, smartphones, personal or mobile multimedia players, personal data assistants (PDA's), personal computers, laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor, and a network interface or transceiver for communicating with large area networks such as the Internet. While the various embodiments are useful with mobile computing devices whose location may change frequently, the embodiments are equally useful with less mobile computing devices, such as desktop computers and workstations.

Computing devices connected to communications networks register with one or more servers that manage the communication links between the network and the computing devices. The server stores the location of the computing device, and this information is used by other proxy servers to locate the device when a message is sent to the device. The location information on the server is periodically updated by the device and/or by the network, such as in the form of the cell identifier (ID) with which the computing device is communicating.

The various embodiments include systems and methods for verifying location information received through messages (e.g., email, text messages, social media posts, etc.) and used in social media applications relying on location based services. When a computing device connects to the communication network, it may use a Session Initiation Protocol (SIP) message to register with one or more servers. The SIP message may include location information. The location information may be derived from location based services built into the computing device such as GPS. The location information is refreshed periodically and as the device changes location. In various embodiments, the location information may be forwarded by the location based services to a server. This information stored in the server may then be used to verify a location of a message sending computing device (the "sending computing device") according to the various embodiments. In some embodiments, this verification may be performed for the sending computing device, while in other embodiments this verification may be performed for the computing device receiving the message including location information (the "receiving computing device").

For example, a user of a sending computing device may send a message for display or use in a social media application to a receiving computing device of a recipient. As part of the message or the social media activity, the user may transmit information regarding or related to the location of the user or the user's computing device, such as an actual location, a city location, a country location, or a transmission time linked to a particular time zone. The user may alter the location reported with the message or social media activity. For this reason, the recipient may not know whether the included location information can be trusted. However, the user will not be able to alter the location information stored at the server. The methods and systems enable a receiver of such location information to verify or receive an indication of the accuracy of the sender's location. This may be useful in verifying the sender, validating information provided by the sender, and verifying information provided by the sender.

Location information may be either low level location information or high level location information. Low level location information may include location information that is provided by lower system layers or components of the sending computing device. The low level location information may also be provided by infrastructure components or in connection with infrastructure components such as base station components. The low level location information may generally be inaccessible by the user.

High level location information may include location information that is provided at the higher system/application layers of the sending computing device. High level location information may include location information that is input into the sending computing device by a user. High level location information may also be location information that is obtained through an application executing on the sending computing device. High level location information may be location information obtained through a website that provides location information. High level location information may generally be accessible to the user of the sending computing device before or while the high level location information is being transmitted to the receiving computing device 103 or to other components or computing devices. Because high level location information can be manipulated by the user, or is provided by an application or a third-party, the accuracy of high level location information cannot be assured.

FIG. 1 illustrates a wireless network system 100 suitable for use with the various embodiments. Wireless communications computing devices 102, 103, and 104 and a wireless transmitter/receiver 106 together make up a wireless data network 108. A sending computing device 102 and a receiving computing device 103 may be connected in the wireless data network 108 via the wireless transmitter/receiver such as a base station 106. Each computing device 104 may also act as a sending or receiving computing device. Using the wireless data network 108, data may be transmitted wirelessly between the computing devices 102, 103, and 104 and the wireless cell tower or base station 106 may be by any of a number of cellular networks and protocols, for example, GSM/GPRS, EDGE/EGPRS, UTMS, WCDMA, HSPA, LTE, etc. The wireless network 108 may be in communication with a router 110, or other infrastructure components that may allow the computing devices connected in the wireless network 108 to connect to a public network such as the Internet 112. In this manner data may be transmitted from/to the computing devices 102, 103, and 104 via the wireless network 108, and router 110 over the Internet 112 to/from a server/registrar server 114 and/or a proxy server 114' by methods well known in the art. While the various embodiments are particularly useful with wireless networks, the embodiments are not limited to wireless networks and may also be implemented, at least in part, over wired networks with no changes to the methods. Further, the computing devices referred to in the descriptions of the various embodiments may be wireless mobile devices. The computing device may also be wireless or wired computing devices that are either fixed or are coupled to network access devices that are fixed.

Figure 2:
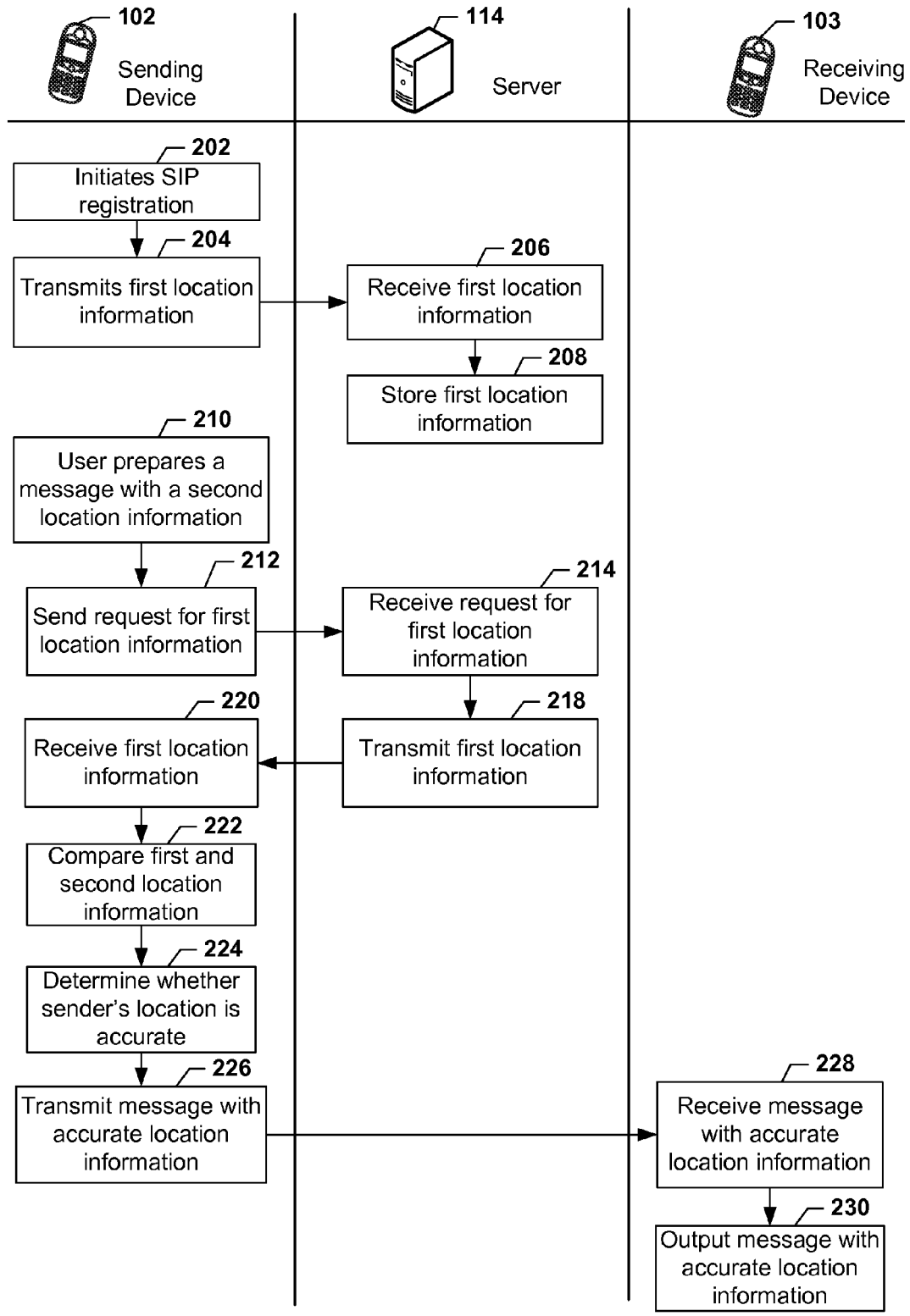
FIG. 2 is a process flow diagram illustrating an embodiment in which the location verification is performed by the sending computing device.

FIG. 2 is illustrates an embodiment method in which location information of a sending computing device 102 may verify the location information entered by a user or by GPS from within a sending computing device 102 prior to or while sending a message to a receiving computing device 103.

In a push-to-talk (PTT) application, the sending computing device 102 and the receiving computing device 102 may exchange location information in messages or other communications as part of the operation of the PTT application. While the embodiment illustrated in FIG. 2 may be particularly useful in a PTT application, the embodiment may be used with other applications including social media applications, messaging application, and other applications that may enable the transfer of location information. The sending computing device 102 and the receiving computing device 103 may each execute a PTT application. Prior to transferring location information as part of the operation of the PTT application, the PTT application may obtain low level location information from low layer subsystems of the computing device or of infrastructure components that the computing device is coupled to. The low layer subsystem may include a modem subsystem, a GPS subsystem, a base station location repository, an infrastructure location repository, a network location repository, or application programming interfaces (APIs) associated with these or other low layer subsystems. The low level location information may include one or more location-related information elements. The location-related information elements may include but are not limited to GPS coordinates, a Subnet ID, a Sector ID, a Base Station ID, a PLMN ID, or other location-related information elements. The low level location information may include a location of the sending computing device that may be based on the location of specific WWAN or WLAN network and equipment the sending computing device 102 is currently associated with.

As the location of the sending computing device changes, the low level location information may also change through updates. Thus, the low level location information stored in the server 114 may be refreshed periodically, such as when the device re-registers or when the location of the device changes.

The sending computing device 102 may establish a connection with the receiving computing device 103 during operation of the PTT application. In block 202, the sending computing device 102 may initiate the connection by sending a session initiation protocol (SIP) registration message to a server 114. In block 204 the sending computing device 102 may transmit the first location information to the server 114. The first location information may include low level information as described above, which is generally inaccessible to the user of the sending computing device 102. The sending computing device 102 may transmit the first location information through the PTT application and interaction between the PTT application and the lower layer subsystems as described above. Because a typical user of the sending computing device 102 may not alter the first location information, it may be deemed to have a given level of accuracy. The level of accuracy may depend on the source of the location information and whether the location information is current. In order to keep the first location information up to date, the sending computing device 102 may periodically update its location information with the server 114. Alternatively, the network itself may update the location information, such as when the sending computing device moves from one cell to another in a cellular communication network.

In block 206 the server 114 may receive the first location information and in block 208 the server 114 may store the first location information. Alternatively, the server 114 may develop the first location information based on its own location (e.g., WiFi access point) when a computing device registers with the server. After the PTT session is established and the sending computing device 102 transmits the first location information to the server 114, in block 210 a user of the sending computing device 102 may prepare a message or other communication to the receiving computing device 103 through the PTT application that includes second location information. The second location information may include high level location information as described above. The second location information may be provided to a higher layer API of the PTT application or other application. In other words, the user of the sending computing device 102 may specify the second location information that is intended to represent the location of the sending computing device 102.

The second location information may be specified in a number of ways. The second location information may be provided by user entry or by utilizing a high level location determination feature such as a GPS receiver or other source of high level location information that is available to a high level operating system (HLOS) API. For example, the second location information may be provided based on the manual entry of a location city by name or by location coordinates. Manual entry may include selecting among a variety of suggested location choices provided by an application. The second location information may be provided based on other references for which a location name or coordinates may be obtained. The second location information references may be obtained or looked up by accessing a secondary information source, such as may be available at a website or server on the Internet. Depending on the source, the second location information may be subject to error, manipulation, or deception, and thus may not be accurate.

In the embodiment method illustrated in FIG. 2, the sending computing device 102 may perform a self-validation of high level location information. In block 212 the sending computing device 102 may send a request to the server 114 for the first location information. In an embodiment, the request may be in the form of a geolocation header in any one of a number of SIP messages that can be sent between SIP entities as described for example in proposed standard for the Internet Engineering Task Force (IETF) RFC6442, Polk et al., December 2011 (based on Internet Draft of Mar. 9, 2009). In block 214 the server 114 may receive the request for the first location information. In block 218 the server 114 may transmit the first location information to the sending computing device 102. The first location information may be sent as a SIP message containing geolocation information that is looked up from various location records for a target device, in this case the sending computing device 102.

In some embodiments, the location of the sending computing device 102, may be coarse location information such as the location of an access point or node used to connect to the server 114, or the location of the server 114 if available. The first location information may be sent from the server 114 in response to the SIP message sent by the computing device 102. In block 220 the sending computing device 102 may receive the first location information. The sending computing device 102 may process the geolocation information in the SIP response from the server 114 and obtain the first location information. In block 222 the sending computing device 102 may compare the first and second location information. In block 224 the sending computing device 102 may determine whether the second location information is accurate. For example, the sending computing device 102 may compare the second location information with the first location information to determine whether the two locations differ by more than a threshold value.

A threshold value for the difference between two locations may be established for determining an acceptable level for the accuracy of the second location information. The threshold may be expressed in meters, miles, global positioning system coordinates. The threshold may be values such as 0.1 mile, 0.2 mile, 0.3 mile, or the equivalent in meters, feet, degrees or other units. If the difference between the first location and the second location information is within the allowable threshold value, the sending computing device 102 may determine that the second location information is accurate. However, if the sending computing device 102 determines that the difference is outside the allowable threshold (e.g., a two mile difference for a 0.2 mile threshold), the sending computing device 102 may determine that the location information supplied by the user (or by a location source) is inaccurate. In some embodiments, an indicator may be provided to the user that visually or audibly indicates the level of deviation between the first location and the second location. The indication may be provided as a visible gradient on a user display, such as in the form of a tone, a bar, a color gradient, or other gradient indication. The value of the indication within such a gradient may be proportional to the difference between the two locations.

If the sending computing device 102 determines that the second location information regarding the sender's actual location is accurate, in block 226 the sending computing device 102 may transmit a message with the verified second location information to the receiving computing device 103. In block 228 the receiving computing device 103 may receive the verified second location information or the message containing the verified second location information. Alternatively, the sending computing device 102 may send the verified second location information or a message containing the verified second location information to the server 114. The server 114 may forward the verified second location information or the message with the second location information to the receiving computing device 103.

In block 230 the receiving computing device 103 may use the verified second location information to know the location of the sending computing device 102. The knowledge of the location of the sending computing device 102 may be subject to the level of accuracy of the second location information. In other words, the verification of the location information may only be to within a given level of accuracy, depending on the verification threshold or other accuracy tolerance factor. The receiving computing device 103 may output a message with the verified second location information. In embodiments, the receiving computing device 103 may or may not be aware that the second location information has been verified. In other embodiments, a verification indication may be provided with the location information indicating that the second location information has been verified. For example, a secure server verification process may be used, such as signing the information using a certificate as is known in the art, and the second location information may be provided with a certification from the secure server or secure server system.

Although not shown in FIG. 2, if the sending computing device 102 determines that its location information is inaccurate (whether generated by the computing device or received from the server), the sending computing device 102 may attach an indication to the message to inform the receiving computing device 103 or other receiving computing device, that the supplied location information is inaccurate or cannot be verified. The sending computing device 102 may then transmit the message with the received second location information and the indication of inaccuracy (or indication of accuracy) to the receiving computing device 103. The receiving computing device 103 may output the message, the second location information, and/or the indication that the second location information may be inaccurate or cannot be verified. Alternatively, if the sending computing device 102 determines that the sender's location information is inaccurate (i.e., the second location information is inaccurate), the sending computing device 102 may substitute the first location information for the second location information and then transmit the message with the first location information to the receiving computing device 103. The receiving computing device 103 may receive the message with the first location information. The receiving computing device 103 may output the message with the first location information. In another embodiment, based on preserving the privacy of the user of the sending computing device 102 a message may be sent indicating that the accuracy of the sending computing device 102 could not be verified. The option to send such a notification may be based on privacy settings on the sending computing device 102.

Figure 3:
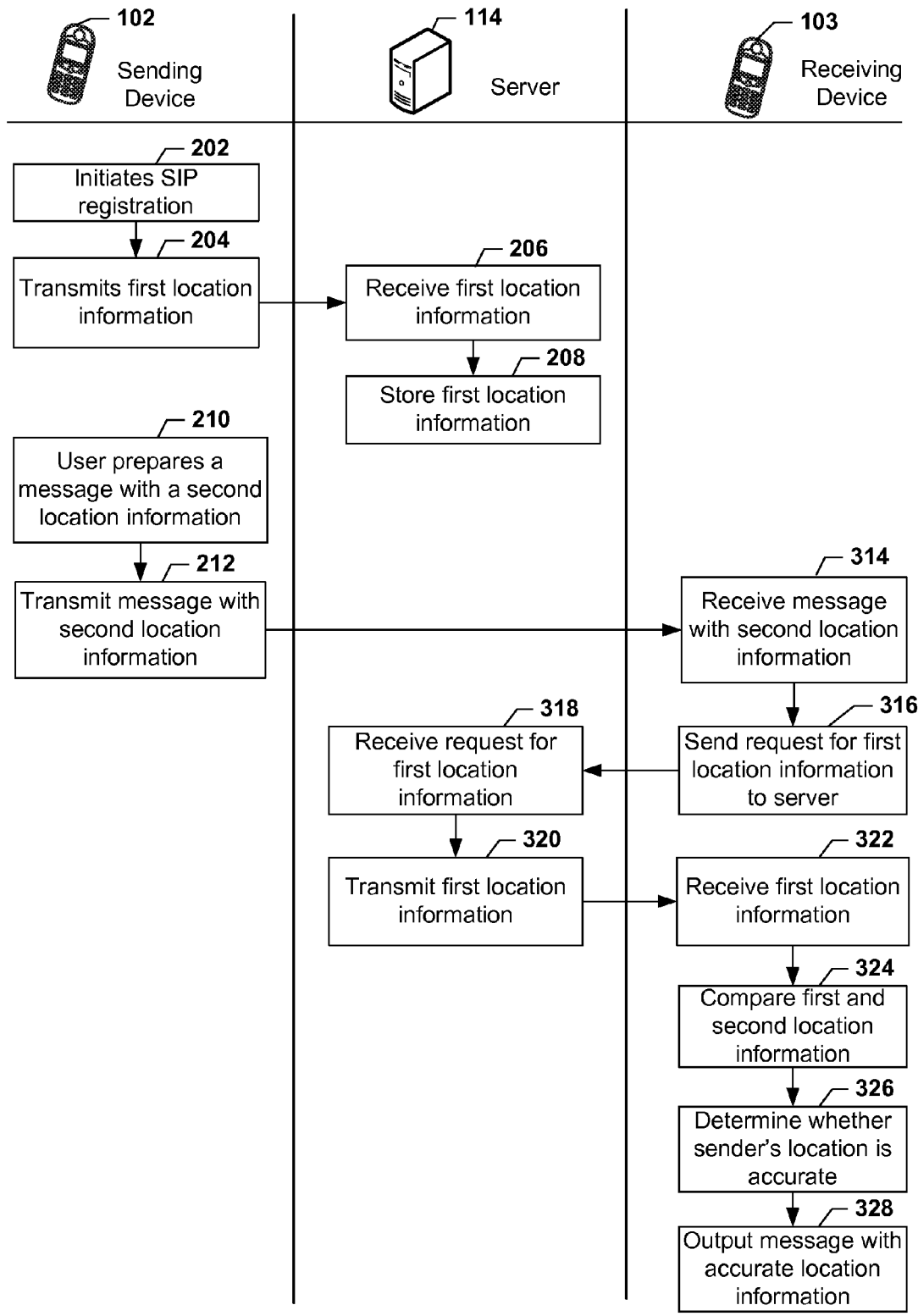
FIG. 3 is a process flow diagram illustrating an embodiment in which location verification is performed by the receiving computing device.

FIG. 3 illustrates a second embodiment method in which a receiving computing device 103 that receives a message including the second location information is configured with processor-executable instructions to query a server 114 for a last known location of the sending computing device 102 (e.g., first location information). The receiving computing device 103 processor compares the location received from the server 114 with the second location information contained in the message. The receiving computing device 103 determines if the two locations are within a defined distance from each other.

Referring to FIG. 3, blocks 202, 204, 206, 208, and 210 are the same or similar to those in FIG. 2 and will therefore not be described again. Thus, similar to the operations described in connection with FIG. 2 the sending computing device 102 may initiate SIP registration and transmit a first location to a sever 114. The server 114 may receive and store the first location information, which may be periodically updated with new location information by the sending computing device 102.

In block 210 a user may prepare a message with a second location information at the sending computing device 102. In block 212 the sending computing device 102 may transmit the second location information or a message with the second location information to a receiving computing device 103. In block 314 the receiving computing device 103 may receive the message with the second location information. In block 316 the receiving computing device 103 may send a request for the first location information to the server 114. In block 318 the server 114 may receive the request for the first information. The server 114 may retrieve the stored first location information (not shown). In block 320 the server 114 may transmit the first location information to the receiving computing device 103. In block 322 the receiving computing device 103 may receive the first location information from the server 114. Thus, by sending/transmitting a request for the first location information and later receiving the first location information, the receiving computing device 103 may query the server 114 regarding the last known location of the sending computing device 102.

The comparison and determination operations in blocks 324 and 326 are similar to the comparison and determination operations in blocks 222 and 224 of the FIG. 2. In block 324 the receiving computing device 103 may compare the first and second location information to verify the second location information. In block 326 the receiving computing device 103 may determine whether the sender's location as indicated by the second location information is accurate. The receiving computing device 103 may determine the accuracy of the second information by determining whether the first and second locations are within a predefined threshold distance of each other. If the difference between the first and second location is within a predefined threshold value, in block 328 the receiving computing device 103 may output the message with the verified second location information.

If the receiving computing device 103 determines that the difference between the first and second location is not within a predefined threshold value, the receiving computing device 103 may generate an indication or provide an indicator that reflects the inaccuracy. The receiving computing device 103 may output the message with the location information and the indication or indicator that the sender's specified location (i.e., second location information) may be inaccurate. Alternatively, the receiving computing device 103 may provide the indicator or indication that the second location information cannot be verified. Alternatively, the receiving computing device 103 may substitute the first location information for the second location information and output the message with the accurate first location information. Alternatively, instead of substituting the first and second location information, the receiving computing device 103 may output both the first and second location information with the message.

Figure 4:
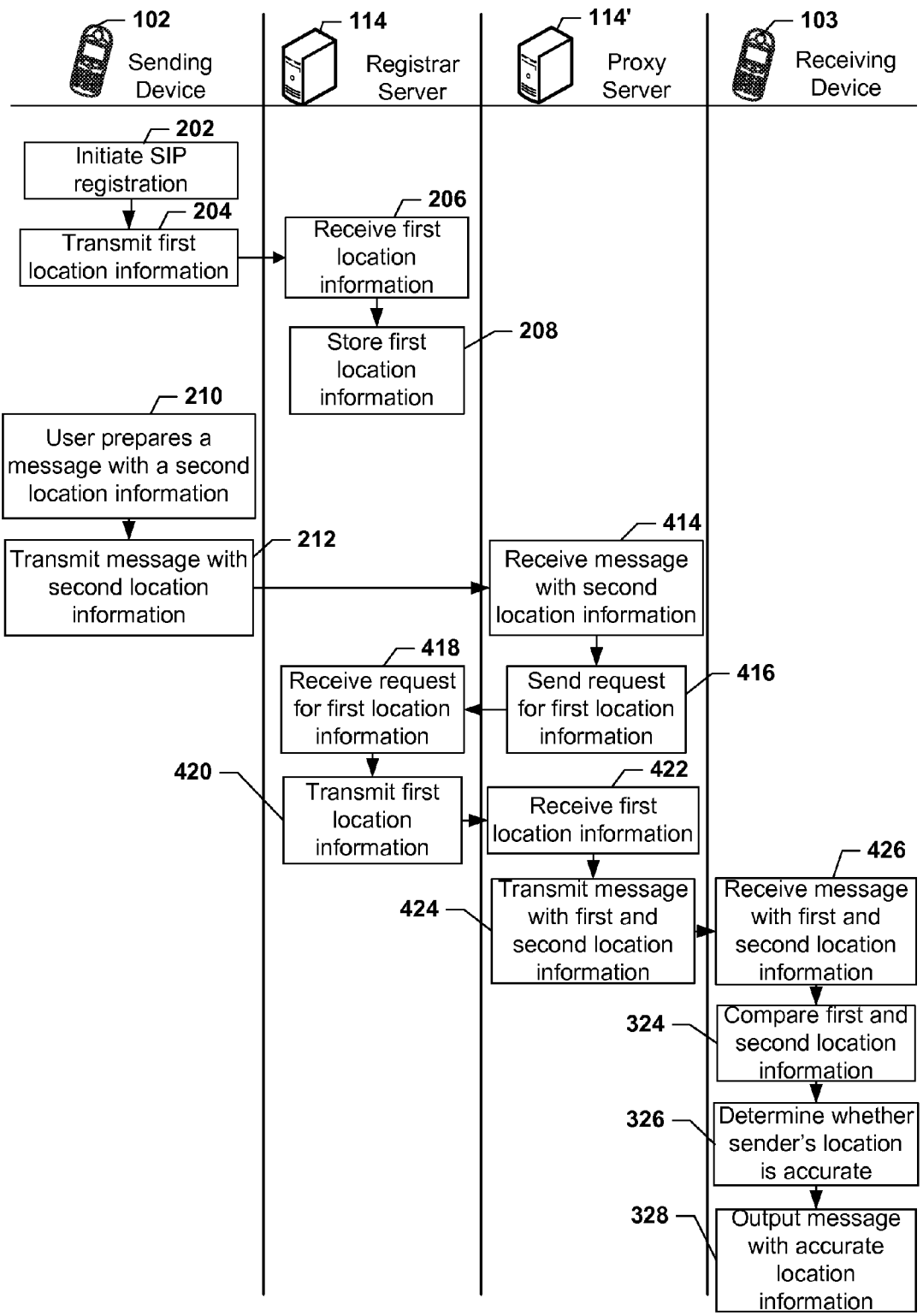
FIG. 4 is a process flow diagram illustrating an embodiment in which location information is appended to the transmitted message by a proxy server, and the receiving computing device compares the appended location information to the information originally contained within the message.

FIG. 4 illustrates a third embodiment method in which one or more proxy servers 114' through which the message passed from the sending computing device 102 to the receiving computing device 103 is configured with server-executable instructions to authenticate the location information (e.g., second location information) included in the message. The receiving computing device 103 may authenticate the second location information by querying the server 114, which in the present example may be a registrar server, for the last known location of the sending computing device 102. The proxy server 114' may append the location information returned from the registrar server 114 (e.g., first location information) to the message being transmitted. When the message is received by the receiving computing device 103, the receiving computing device 103 may compare the appended location to the second location information contained in the message. The receiving computing device 103 determines if the two locations are within a predefined distance from each other.

Referring to FIG. 4, blocks 202, 204, 206, 208, 210 are similar to the same numbered blocks described above with reference to FIGS. 2 and 3 except that the first location information is transmitted to and received by a registrar server 114 (as opposed to the server 114) which stores the first location information and updates it accordingly as needed. The registrar server may be the same as the server 114 described above with reference to FIGS. 2 and 3; however, it is referred to as the registrar server 114 in FIG. 4 to clarify that it may be separate from a proxy server 114'.

In block 210 a user of the sending computing device 102 may prepare a message with a second location information. In block 212 the sending computing device 102 may transmit a message with the second location information to the proxy server 114'. In block 414 the proxy server 114' may receive the message with the second location information. In block 416 the proxy server 114' may send a request for the first location information to the registrar server 114. In block 418 the registrar server 114 may receive the request for the first location information. The registrar server 114 may retrieve the stored first location information (not shown). In block 420 the registrar server 114 may transmit the first location information to the proxy server 114'. In block 422 the proxy server 114' may receive the first location information. The proxy server 114' may append the first location information to the received message (not shown). In block 424 the proxy server 114' may transmit the message with the first and second location information to the receiving computing device 103. In block 426 the receiving computing device 103 may receive the message with the first and second location information.

Operations in blocks 324, 326, and 328 are the same as those described above with reference to FIG. 3. The receiving computing device 103 may compare first and second location from the received message, determine whether the sender's location (i.e., second location information) is accurate based on a predetermined threshold value, and output the message with accurate location information. As with FIG. 3, the receiving computing device 103 in FIG. 4 may determine that the sender's location (i.e., second location information) is accurate and output it along with the message. The receiving computing device 103 may determine that the sender's location (i.e., second location information) is not accurate. When the sender's location is not accurate, the receiving computing device 103 may substitute the accurate first location information for the second location information and output the message with the first location information. Alternatively, the receiving computing device 103 may output the message with the inaccurate sender's location (i.e., second location information) as well as an indication that the sender's location may be inaccurate or cannot be verified.

Figure 5:
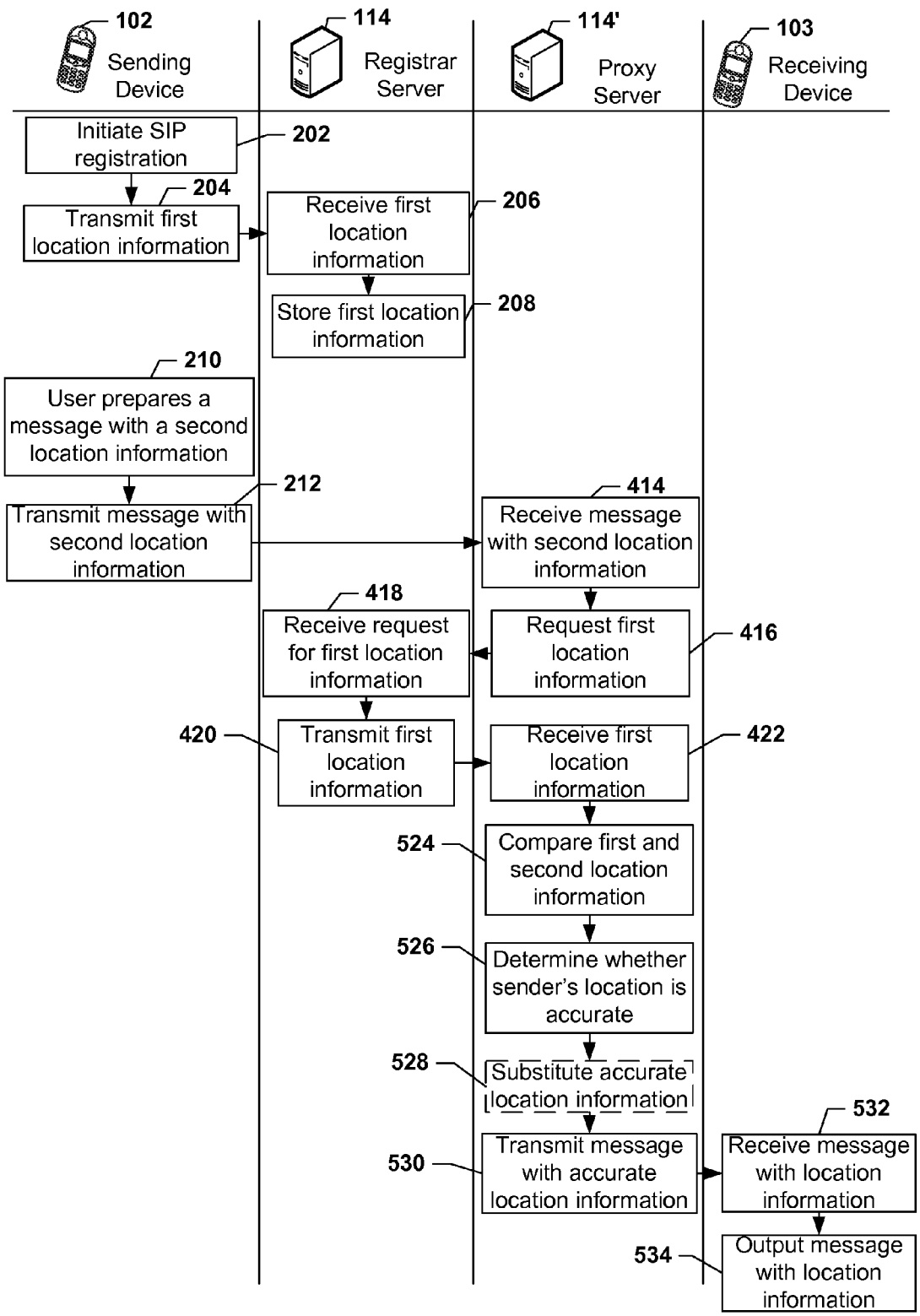
FIG. 5 is a process flow diagram illustrating an embodiment in which location verification is performed by a proxy server, wherein the proxy server substitutes accurate location information in place of inaccurate location information originally contained within the message

FIG. 5 illustrates a fourth embodiment method in which one or more proxy servers 114' through which the message passed from the sending computing device 102 to the receiving computing device 103 is configured with server-executable instructions to authenticate the location information included in the message by querying the registrar server 114 for the last known location of the sending computing device 102. The processor in the proxy server 114' compares the location returned from the registrar server 114 to the location information contained in the original message and determines if the two locations are within a defined distance from each other in order to authenticate the location information. If a difference between the locations is within a threshold value (i.e., the locations are within a defined distance from each other), the proxy server 114' sends the message on to the receiving device including the now authenticated location information. If the locations are not within a defined distance from each other, the proxy server 114' substitutes the location information received from the registrar server 114 for the location information originally contained in the message, and sends the message containing the authenticated (i.e., replaced) location information to the receiving device. In this embodiment, the receiving computing device 103 may or may not be aware of the substitution.

Referring to FIG. 5, operations in blocks 202, 204, 206, 208, 210, 212, 414, 418, 416, 420, 422 are the same as those in like numbered blocks described above with reference to FIG. 4. Referring to block 524 the proxy server 114' may compare the first and second location information. In block 536 the proxy server 114' may determine whether the sender's location information is accurate. The proxy server 114' may determine whether the first and second location are within a predetermined threshold value (e.g., within a tenth of a mile). When the first and second location are within a predefined or predetermined threshold value (i.e., a determination that the sender's location (second location) is accurate, in block 530 the proxy server 114' may transmit the message with the accurate location information (i.e., the second location information) to the receiving computing device 103. In block 532 the receiving computing device 103 may receive the message with the accurate location information (i.e., second location information). In block 534 the receiving computing device 103 may output the message with the accurate location information (i.e., the second location information).

However, if the first and second locations are not within a predefined or predetermined threshold value, then in optional block 528 the proxy server may substitute the accurate location information (i.e., the first location information) in the message. Thus, the operations in blocks 530, 532, and 533 may be repeated with the substitute first location information. Instead of substituting the location information, the proxy server 114' may simply send an accuracy indicator (e.g., "unconfirmed location) along with the message and the receiving computing device 103 may output the message, the location information, and/or the accuracy indication.

Figure 6:
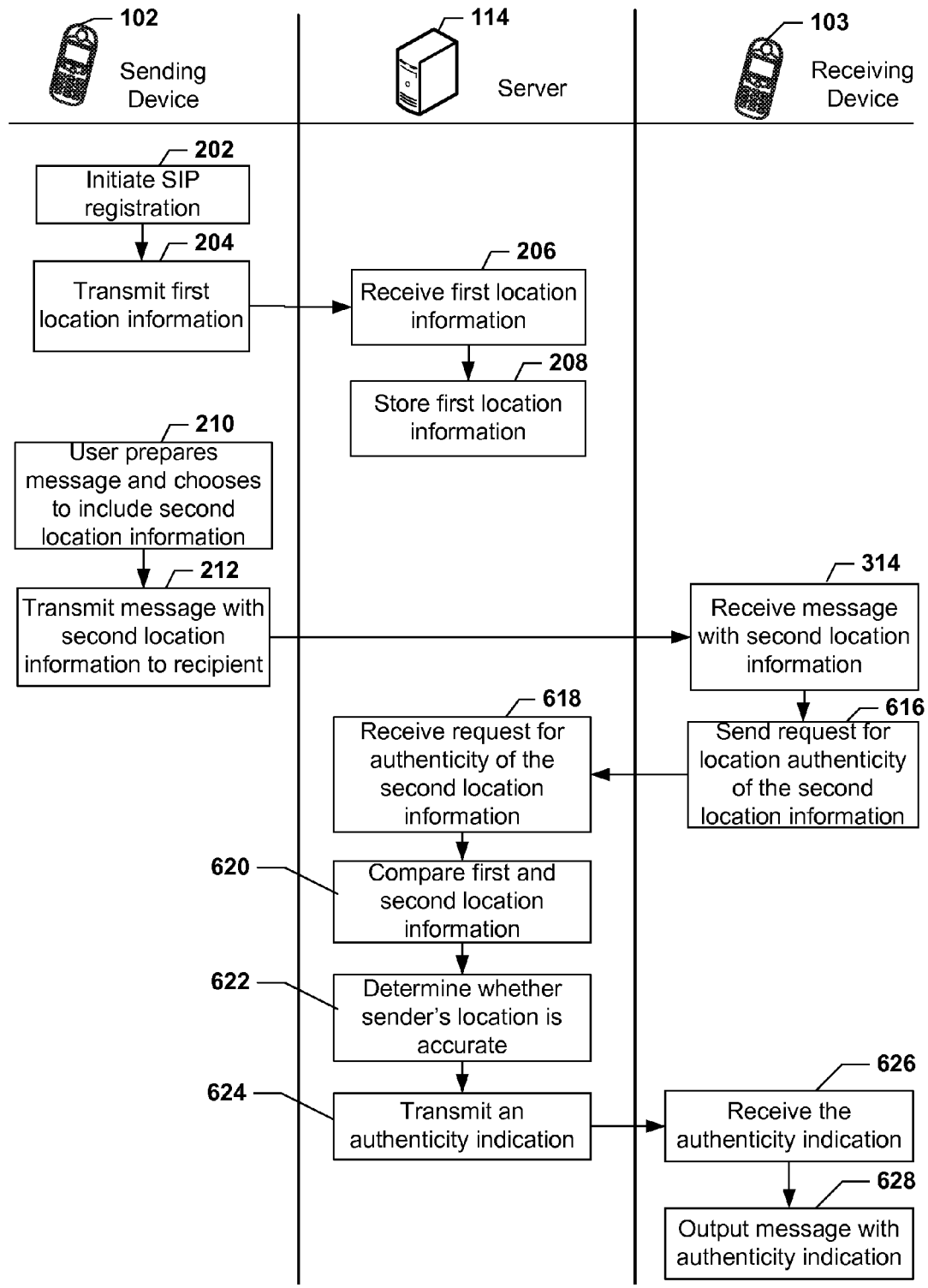
FIG. 6 is a process flow diagram illustrating an embodiment in which location verification is performed in the server in which the sending computing device's location information is stored in response to a query from the receiving computing device.

FIG. 6 illustrates a fifth embodiment method in which the server 114 is configured with server-executable instructions to authenticate the location of the sending computing device 102 in response to a query from the receiving computing device 103.

In this embodiment, as well as the others, when the sending device 102 sends location information to the receiving computing device 103 this information exchange may not be direct. Specifically, the location information may be transmitted from the sending computing device 102 to the server 114 in which the sending computing device 102 is registered. The server 114 has coarse location information for the sending device 102, such as a cellular communication system cell ID, an Access point ID in case of a WiFi network, or other location information. In this embodiment, upon receiving the location information from the sending computing device 102, the server 114 can authenticate that information. Authentication may involve comparing the location coming from the sending device 102 to the stored location information of the sending device 102. Based on the results of this comparison the server 114 may send authentication metadata (verified, reasonable, not reasonable, false or other authentication metadata) along with the location information to the receiving computing device 103. Thus, the server 114 transmits a message to the receiving computing device 103 indicating whether the reported location of the sending computing device 102 is authenticated. The receiving computing device 103 receives the authentication message from the server 102 and may notify the user of the authentication status of the location or take other action.

Referring to FIG. 6, the operations in blocks 202, 204, 206, 208, 210, 212, 314 are the same as the operations in like numbered blocks described above with reference to FIG. 3. In the embodiment illustrated in FIG. 6, the receiving computing device 103 may send a request for location authenticity of the second location information in block 616. In block 618 the server may receive the request for authenticity of the second location information. In block 620 the server 114 may compare the first location information with the second location information. In block 622 the server 114 may determine whether the sender's location is accurate based on the comparison. In block 624 the server 114 may transmit an authenticity indication to the receiving computing device 103. In block 626 the receiving computing device 103 may receive the authenticity indication. In block 628 the receiving computing device 103 may output the message with the authenticity indication.

In some embodiments, the sending computing device 102 and/or the receiving computing device 103 may receive a notification and/or an indication that the location information has been updated. The notification may be a message, a system level notification or other notification. The indication may be a graphic on the display such as a flag or icon, or any other suitable indication. Alternatively, the sending computing device 102 and/or receiving computing device 103 may display an indication of the calculated accuracy of the location information contained in the message. This indication may be a numerical scale, a gradient, or any other method of indicating various degrees of accuracy. The indication may be a form of certification that the location information provided in a received message has been verified as being accurate.

In an embodiment, the sending computing device 102 may receive a message indicating that an intermediate server 114 or the receiving computing device 103 has requested location confirmation. In an embodiment, the user of the sending computing device 102 may be given the opportunity to allow or block the location confirmation request. If the request is blocked, the requesting device may not receive location confirmation. The user's preference may be stored either locally and/or in the server 114, and used as a default response in future requests.

Figure 7:
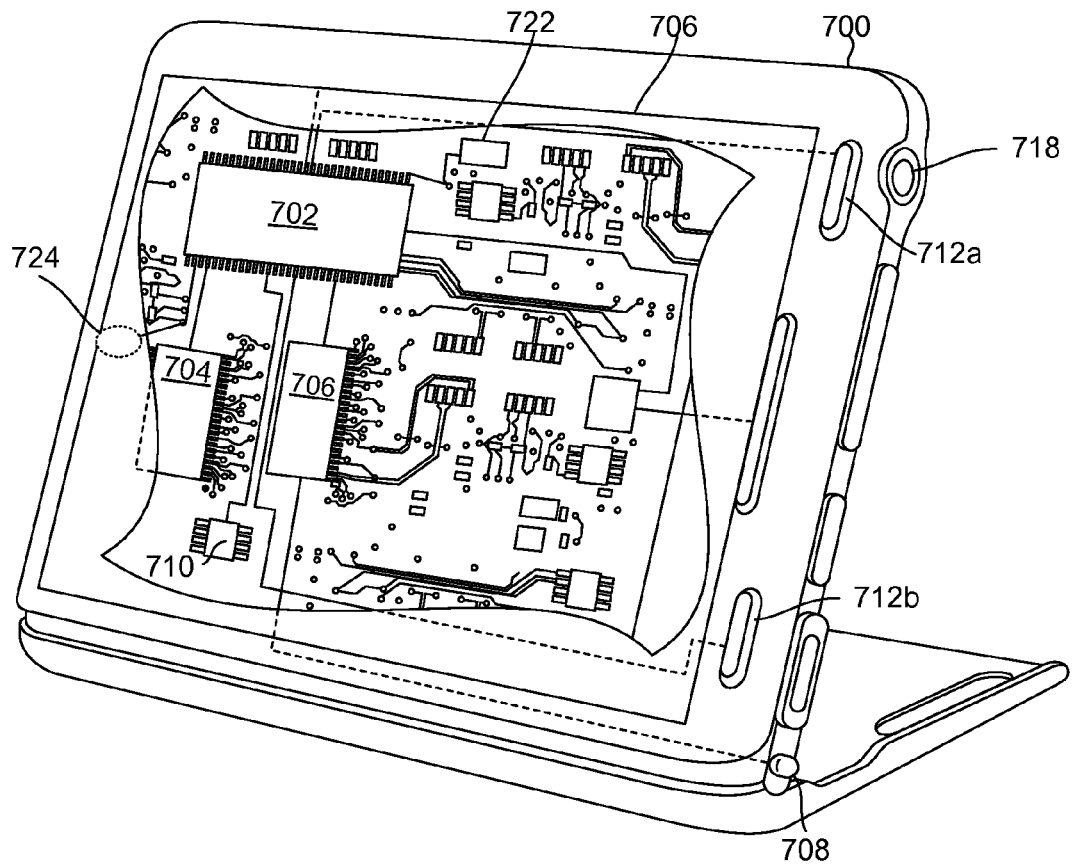
FIG. 7 is a component diagram of an example wireless device suitable for use with the various embodiments.

The various embodiments may be implemented in any of a variety of computing devices, including mobile devices, an example of which is illustrated in FIG. 7. For example, the mobile device 700 may include a processor 702 coupled to internal memories 704 and 710. Internal memories 704 and 710 may be volatile or non-volatile memories, and may also be secure and/or encrypted memories, or unsecure and/or unencrypted memories, or any combination thereof. The processor 702 may also be coupled to a touch screen display 706, such as a resistive-sensing touch screen, capacitive-sensing touch screen infrared sensing touch screen, or the like. Additionally, the display of the mobile device 700 need not have touch screen capability. Additionally, the mobile device 700 may have one or more antenna 708 for sending and receiving electromagnetic radiation that may be connected to a wireless data link and/or cellular telephone transceiver 716 coupled to the processor 702. The mobile device 700 may also include physical buttons 712a and 712b for receiving user inputs. The mobile device 700 may also include a power button 718 for turning the mobile device 700 on and off.

Figure 8:
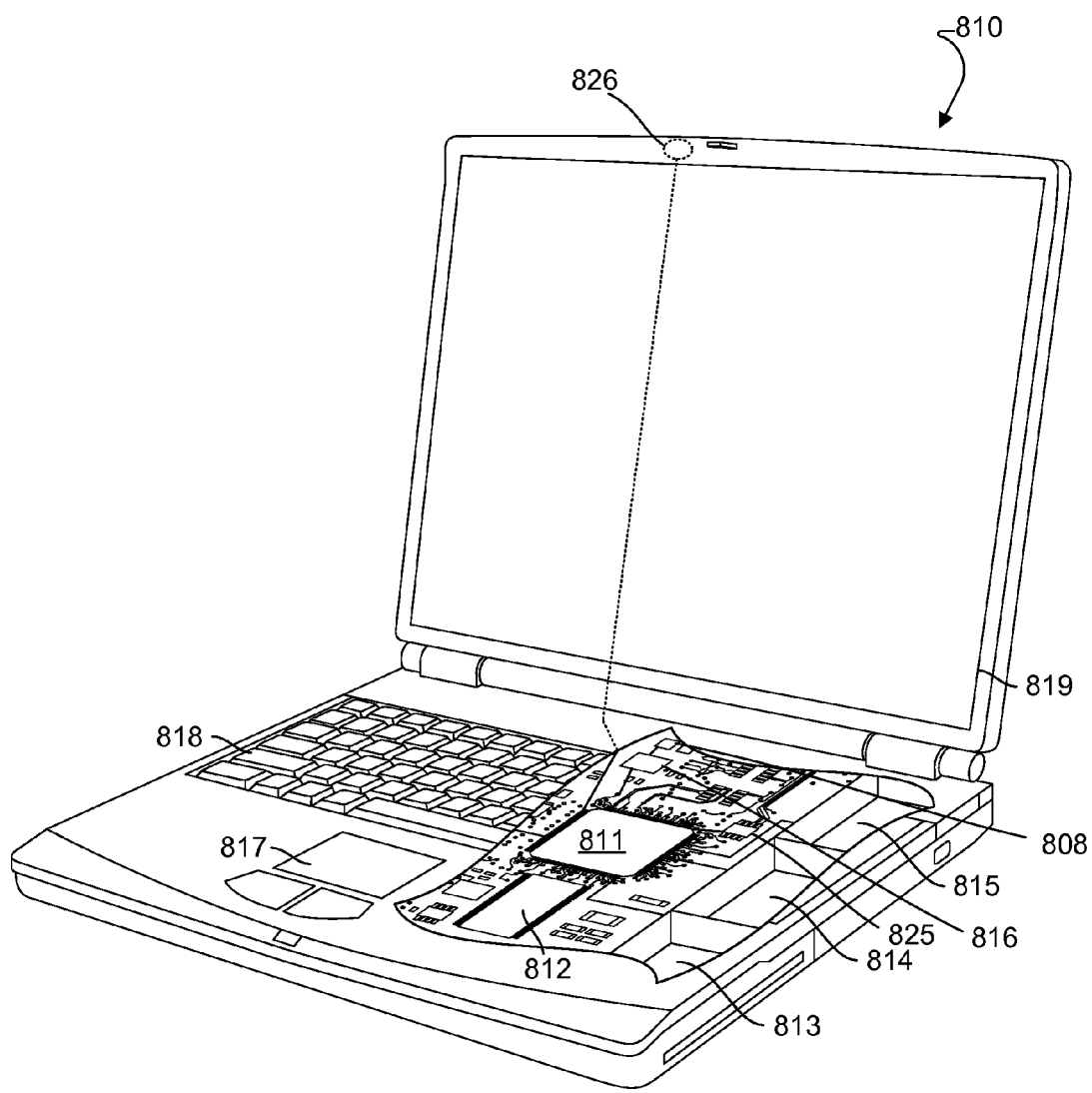
FIG. 8 is a component diagram of another examine wireless device suitable for use with the various embodiments.

The various embodiments described above may also be implemented within a variety of personal computing devices, such as a laptop computer 810 as illustrated in FIG. 8. Many laptop computers include a touch pad touch surface 817 that serves as the computer's pointing device, and thus may receive drag, scroll, and flick gestures similar to those implemented on mobile computing devices equipped with a touch screen display and described above. A laptop computer 810 will typically include a processor 811 coupled to volatile memory 812 and a large capacity nonvolatile memory, such as a disk drive 813 of Flash memory. The computer 810 may also include a floppy disc drive 814 and a compact disc (CD) drive 815 coupled to the processor 811. The computer device 810 may also include a number of connector ports coupled to the processor 811 for establishing data connections or receiving external memory devices, such as a USB or FireWire® connector sockets, or other network connection circuits for coupling the processor 811 to a network. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be use in conjunction with the various embodiments.

Figure 9:
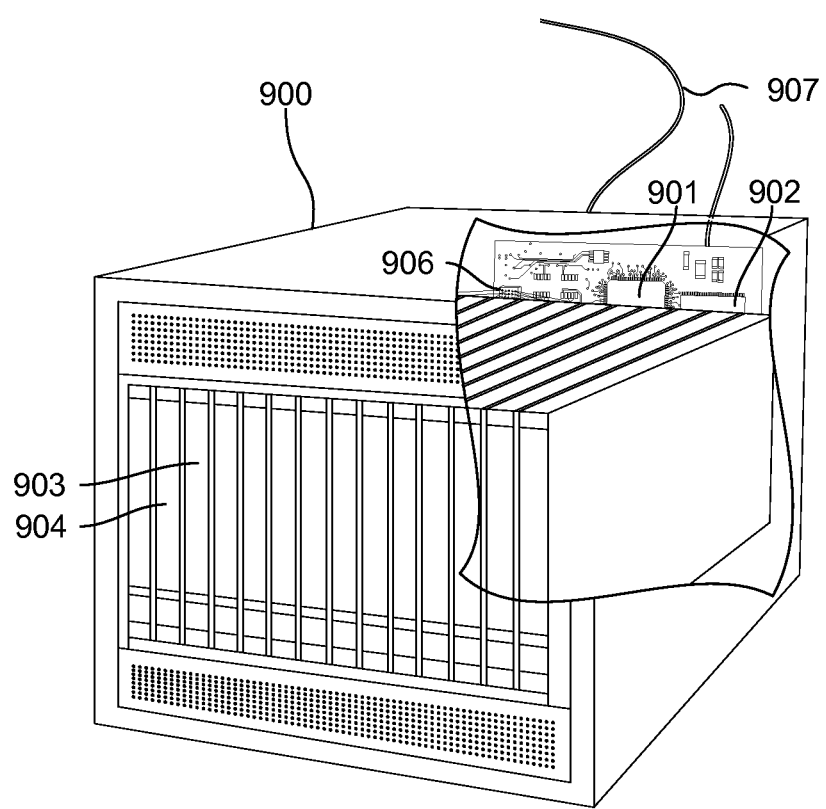
FIG. 9 is a component diagram of an example server suitable for use with the various embodiments.

The various embodiments may also be implemented on any of a variety of commercially available servers configured with server-executable instructions to perform the embodiment methods, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing network interface connections with a network 907, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 702, 811, and 901 may be any programmable microprocessor, microcomputer or multiple processor chip or chips that can be configured by software instructions (applications) to perform a variety of functions, including the functions of the various embodiments described above. In some mobile devices, multiple processors may be provided, such as one processor dedicated to wireless communication functions and one processor dedicated to running other applications. Typically, software applications may be stored in the internal memory 704, 710, 812, 813, 902, and 903 before they are accessed and loaded into the processors 702, 811, and 901. The processors 702, 811, and 901 may include internal memory sufficient to store the application software instructions. The internal memory may be a volatile or nonvolatile memory, such as flash memory, or a mixture of both. For the purposes of this description, a general reference to memory refers to memory accessible by the processors 702, 811, and 901 including internal memory or removable memory plugged into the server or computing device and memory within the server or computing device 702, 811, and 901.

While the terms "first" and "second" are used herein to describe location information associated with user entered location information and location information that is a part of a sending computing device's registration process. These identifiers are merely for convenience and are not meant to limit the various embodiments to a particular order, sequence, type of network or carrier. Further, while the various embodiments may be described with respect to two pieces of location information assigned to a sending computing device, such description is provided merely as an example and is not meant to limit the amount of location information for a given mobile device. For example, a sending computing device may periodically update its registration location information with a server and thus the first location information may be periodically updated. Alternatively, user entered location information may be change or replaced depending on software in the sending device or the actions of the user.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a server, general purpose processor, a digital signal processor (DSP), an application specific integrated circuit (ASIC), a field programmable gate array (FPGA) or other programmable logic device, discrete gate or transistor logic, discrete hardware components, or any combination thereof designed and configured with server-executable or processor-executable instructions to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

The functions of the various embodiments described above may be implemented in hardware, software, firmware, or any combination thereof. If implemented in software, the functions may be stored as one or more instructions or code on a non-transitory computer-readable medium. The operations of a method or algorithm disclosed herein may be embodied in a processor-executable or server-executable software module, which may reside on a non-transitory computer-readable storage medium. Non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for authenticating location information provided in messages, comprising:
   comparing location information incorporated in a message, from a sending computing device at an actual location to a receiving computing device, with low-level information regarding the actual location of the sending computing device maintained in a server, wherein the low-level information is inaccessible to a user; and
   authenticating the location information based on the comparison.

2. The method of claim 1, wherein authenticating the location information based on the comparison comprises:
   determining whether a difference between the location information incorporated in the message and the low-level information regarding the actual location of the sending computing device maintained in a server is within a defined threshold; and
   authenticating the location information incorporated in the message when the difference between the location information incorporated in the message and the low-level information regarding the actual location of the sending computing device maintained in the server is within the defined threshold.

3. The method of claim 1, further comprising:
   receiving, in the server, a registration of the sending computing device including low-level location information regarding the actual location of the sending computing device;
   receiving in the server from the sending computing device a request for the low-level information regarding the actual location of the sending computing device maintained in the server; and
   sending, from the server to the sending computing device, the low-level information regarding the actual location of the sending computing device maintained in the server in response to the request,
   wherein comparing location information incorporated in the message from the sending computing device with low-level information regarding the actual location of the sending computing device maintained in the server and authenticating the location information based on the comparison is performed in the sending computing device prior to transmitting the message to the receiving computing device.

4. The method of claim 1, further comprising:
   receiving, in the server, a registration of the sending computing device including low-level information regarding the actual location of the sending computing device;
   receiving in the server from the receiving computing device a request for the low-level information regarding the actual location of the sending computing device maintained in the server; and
   sending, from the server to the sending computing device, the low-level information regarding the actual location of the sending computing device maintained in the server in response to the request,
   wherein comparing location information incorporated in the message from the sending computing device with low-level information regarding the actual location of the sending computing device maintained in the server and authenticating the location information based on the comparison and authenticating the location information based on the comparison are performed in the receiving computing device.

5. The method of claim 1, further comprising:
receiving, in the server, a registration of the sending computing device including low-level location information regarding the actual location of the sending computing device;
receiving in a proxy server the message from the sending computing device;
receiving, in the server, a request from the proxy server for the low-level information regarding the actual location of the sending computing device maintained in the server;
providing, from the server to the proxy server, a response that includes the low-level information regarding the actual location of the sending computing device maintained in the server; and
providing, from the proxy server to the receiving computing device, the message from the sending computing device including the location information provided by the sending computing device and the low-level information regarding the actual location of the sending computing device maintained in the server,
wherein comparing location information incorporated in the message from the sending computing device with low-level information regarding the actual location of the sending computing device maintained in the server and authenticating the location information based on the comparison are performed in the receiving computing device based on information received from the proxy server.

6. The method of claim 1, further comprising:
receiving, in the server, a registration of the sending computing device including low-level location information regarding the actual location of the sending computing device;
receiving in a proxy server the message from the sending computing device;
receiving, in the server, a request from the proxy server for the low-level information regarding the actual location of the sending computing device maintained in the server;
sending, from the server to the proxy server, the low-level information regarding the actual location of the sending computing device maintained in the server in response to the request, wherein comparing location information incorporated in the message from the sending computing device with low-level information regarding the actual location of the sending computing device maintained in a server and authenticating the location information based on the comparison are performed in the proxy server; and
providing, from the proxy server to the receiving computing device, the message from the sending computing device including authenticated location information.

7. The method of claim 6, wherein providing, from the proxy server to the receiving computing device, the message from the sending computing device including authenticated location information comprises substituting in the message provided to the receiving computing device the location information included in the message by the sending computing device with the low-level information regarding the actual location of the sending computing device maintained in a server.

8. The method of claim 1, further comprising:
receiving, in the server, a registration of the sending computing device including low-level location information regarding the actual location of the sending computing device;
receiving, in the server, a query from the receiving computing device that includes location information incorporated in the message, wherein comparing location information incorporated in the message from a sending computing device at an actual location to a receiving computing device with low-level information regarding the actual location of the sending computing device maintained in a server comprises comparing, by the server, the location information incorporated in the message received from the receiving computing device with the low-level location information regarding the actual location of the sending computing device maintained by the server; and
authenticating the location information based on the comparison comprises providing an indication to the receiving computing device of a result of the comparison of the location information incorporated in the message with the actual location of the sending computing device maintained in the server in response to the query.

9. A proxy server for authenticating location information provided in a message sent from a sending computing device to a receiving computing device, the proxy server configured with server executable instructions to perform operations comprising:
receiving the message from the sending computing device including information regarding the sending computing device's location;
sending a request to a server for the location information regarding an actual location of the sending computing device maintained in the server;
receiving a response from the server that includes the location information regarding the actual location of the sending computing device maintained in the server;
comparing the information regarding the sending computing device's location included in the message received from the sending computing device to the location information regarding the actual location of the sending computing device received from the server; and
sending the message received from the sending computing device to the receiving computing device including authenticated location information.

10. The proxy server of claim 9, wherein the proxy server is configured with instructions to perform operations further comprising sending to the receiving computing device the message received from the sending computing device including information regarding the sending computing device's location along with the location information regarding the actual location of the sending computing device maintained in the server.

11. The proxy server of claim 9, wherein the proxy server is configured with instructions to perform operations such that authenticating the location information based on the comparison comprises:
determining whether a difference between the information regarding the sending computing device's location included in the message and the location information regarding the actual location of the sending computing device received from the server is within a defined threshold; and authenticating the information regarding the sending computing device's location included in the message in response to determining that the difference between the information regarding the sending computing device's location included in the message and the location information regarding the actual location of the sending computing device received from the server is within the defined threshold.

12. The proxy server of claim 9, wherein the proxy server is configured with instructions to perform operations further comprising:
  comparing the information regarding the sending computing device's location included in the message received from the sending computing device to the location information regarding the actual location of the sending computing device received from the server;
  determining whether a difference between the information regarding the sending computing device's location included in the message received from the sending computing device to the location information regarding the actual location of the sending computing device received from the server is within a defined threshold;
  substituting in the message the location information regarding the actual location of the sending computing device received from the server for the information regarding the sending computing device's location in response to determining that the difference is not within the defined threshold; and
  sending the message to the receiving computing device.

13. A computing device, comprising a processor configured with processor executable instructions to perform operations comprising:
  receiving a message from a sending computing device including information regarding the sending computing device's location;
  obtaining an authentication of the information regarding the sending computing device's location based on location information regarding an actual location of the sending computing device maintained in a server;
  sending to the server a request for the location information regarding the actual location of the sending computing device maintained in the server;
  receiving from the server the location information regarding the actual location of the sending computing device maintained in the server;
  comparing the information regarding the sending computing device's location included in the message to the location information regarding the actual location of the sending computing device received from the server; and
  authenticating in the computing device the information regarding the sending computing device's location included in the message based on the comparison.

14. The computing device of claim 13, wherein the processor is configured with processor executable instructions to perform operations such that authenticating in the computing device the location of the sending computing device's location included in the message based on the comparison comprises:
  determining whether a difference between the information regarding the sending computing device's location included in the message and the location information regarding the actual location of the sending computing device received from the server is within a defined threshold; and
  authenticating the location of the sending computing device's location included in the message in response to determining that the difference between the information regarding the sending computing device's location included in the message and the location information regarding the actual location of the sending computing device received from the server is within the defined threshold.

15. The computing device of claim 13, wherein the processor is configured with processor-executable instructions to perform operations such that obtaining an authentication of the information regarding the sending computing device's location based on location information regarding the actual location of the sending computing device maintained in a server comprises:
  sending to the server a request to authenticate the information regarding the sending computing device's location included in the message; and
  receiving from the server an authentication of the information regarding the location of the sending computing device's location based on the location information regarding the actual location of the sending computing device maintained in the server.

16. The computing device of claim 13, wherein the processor is configured with processor executable instructions to perform operations such that obtaining an authentication of the information regarding the sending computing device's location based on location information regarding the actual location of the sending computing device maintained in a server comprises:
  receiving from a proxy server the message from the sending computing device including the information regarding the sending computing device's location and the location information regarding the actual location of the sending computing device maintained in the server;
  comparing the information regarding the location of the sending computing device's location included in the message to the location information regarding the actual location of the sending computing device received from the proxy server; and
  authenticating in the computing device the location of the sending computing device's location included in the message based on the comparison.

17. The computing device of claim 16, wherein the processor is configured with processor executable instructions to perform operations such that authenticating in the computing device the location of the sending computing device's location included in the message based on the comparison comprises:
  determining whether a difference between the information regarding the location of the sending computing device's location included in the message and the location information regarding the actual location of the sending computing device received from the server is within a defined threshold; and
  authenticating the location of the sending computing device's location included in the message in response to determining that the difference between the information regarding the location of the sending computing device's location included in the message and the location information regarding the actual location of the sending computing device received from the server is within the defined threshold.

18. The computing device of claim 13, wherein the processor is configured with processor executable instructions to perform operations such that obtaining an authentication of the information regarding the sending computing device's location based on location information regarding the actual location of the sending computing device maintained in a server comprises receiving from a proxy server the message including either the information regarding the sending computing device's location included in the message sent by the sending computing device or the location information regarding the actual location of the sending computing device maintained in the server.

* * * * *